(12) United States Patent
Brewer

(10) Patent No.: US 9,706,351 B1
(45) Date of Patent: Jul. 11, 2017

(54) EMERGENCY CALL OVER A DATA NETWORK

(71) Applicant: PEERLESS NETWORK, INC., Chicago, IL (US)

(72) Inventor: James E. Brewer, Chicago, IL (US)

(73) Assignee: PEERLESS NETWORK, INC., Chicago, IL (US)

( * ) Notice: Subject to any disclaimer, the term of this patent is extended or adjusted under 35 U.S.C. 154(b) by 0 days.

(21) Appl. No.: 15/142,185

(22) Filed: Apr. 29, 2016

(51) Int. Cl.
  H04W 4/22 (2009.01)
  H04W 36/14 (2009.01)
  H04W 4/02 (2009.01)
  H04W 40/02 (2009.01)
  H04L 29/06 (2006.01)
  H04M 7/00 (2006.01)

(52) U.S. Cl.
  CPC ........... *H04W 4/02* (2013.01); *H04L 65/1006* (2013.01); *H04L 69/22* (2013.01); *H04W 4/22* (2013.01); *H04W 40/02* (2013.01); *H04M 7/006* (2013.01)

(58) Field of Classification Search
  CPC ....... H04W 76/007; H04W 4/02; H04W 4/22; H04W 48/18; H04W 12/08; H04W 4/16; H04L 61/2564; H04L 65/105; H04L 65/1069; H04L 65/1016
  USPC ............ 455/404.1, 404.2, 414.1–414.4, 417, 455/456.1–456.6, 403, 550.1, 564
  See application file for complete search history.

(56) References Cited

U.S. PATENT DOCUMENTS

| 7,532,875 | B1 | 5/2009 | Parks et al. |
| 7,620,391 | B2 | 11/2009 | Itzkovitz et al. |
| 7,664,495 | B1 | 2/2010 | Bonner et al. |
| 7,742,774 | B2 | 6/2010 | Oh et al. |
| 7,742,783 | B2 | 6/2010 | Duarte |
| 7,778,663 | B2 | 8/2010 | Bong Doo |
| 7,856,226 | B2 | 12/2010 | Wong et al. |

(Continued)

FOREIGN PATENT DOCUMENTS

| WO | WO-02096026 A1 | 11/2002 |
| WO | WO-2007089681 A2 | 8/2007 |

(Continued)

OTHER PUBLICATIONS

Engadget.com, "Scratch Wireless offers 'free' mobile service that uses WiFi for calls and text," (2014). ; Retrieved from the Internet on Aug. 21, 2014 at: ; <URL: https://www.engadget.com/2013/10/16/scratch-wireless/>.

(Continued)

*Primary Examiner* — Khawar Iqbal
(74) *Attorney, Agent, or Firm* — Marshall, Gerstein & Borun LLP; Randall G. Rueth

(57) ABSTRACT

Techniques for originating an emergency call over a data network include determining whether or not a location services are currently available. Call control may be released to the native dialer when the location services are currently unavailable. Otherwise, the call may be processed by the application dialer, and may be routed from the mobile device towards a Public Safety Answering Point (PSAP) by using a private packet backbone network exchange. The application dialer may be configured to utilize a packet header format that indicates a geographic location of the mobile device when communicating with an emergency call router interconnected with the private packet backbone network exchange.

17 Claims, 4 Drawing Sheets

(56) References Cited

U.S. PATENT DOCUMENTS

| | | | |
|---|---|---|---|
| 7,881,976 B2 | 2/2011 | Dayton et al. |
| 7,885,654 B2 | 2/2011 | Fadell |
| 7,885,661 B2 | 2/2011 | Cai |
| 7,962,152 B2 | 6/2011 | Buerger et al. |
| 7,970,419 B2 | 6/2011 | Oh et al. |
| 8,059,097 B2 | 11/2011 | Duarte et al. |
| 8,060,836 B2 | 11/2011 | Duarte |
| 8,184,575 B2 | 5/2012 | Miyagi et al. |
| 8,265,243 B2 | 9/2012 | Alexander et al. |
| 8,265,324 B2 | 9/2012 | Duarte et al. |
| 8,391,834 B2 | 3/2013 | Raleigh |
| 8,526,591 B2 | 9/2013 | Morken et al. |
| 8,630,630 B2 | 1/2014 | Raleigh |
| 8,634,531 B2 | 1/2014 | Morken et al. |
| 8,635,335 B2 | 1/2014 | Raleigh et al. |
| 8,670,771 B2 | 3/2014 | Brownworth et al. |
| 8,718,682 B2 | 5/2014 | Brownworth |
| 8,730,920 B2 | 5/2014 | Brownworth et al. |
| 8,750,250 B2 | 6/2014 | Milam et al. |
| 8,761,778 B2 | 6/2014 | Mulcahy et al. |
| 8,787,919 B1 | 7/2014 | Mulcahy et al. |
| 8,797,267 B2 | 8/2014 | Duarte et al. |
| 8,825,876 B2 | 9/2014 | Krishnaswamy et al. |
| 8,825,881 B2 | 9/2014 | Mulcahy et al. |
| 9,497,606 B1 * | 11/2016 | Brewer | H04W 4/16 |
| 2004/0185827 A1 | 9/2004 | Parks |
| 2006/0015467 A1 | 1/2006 | Morken et al. |
| 2006/0286991 A1 * | 12/2006 | Palacio | H04M 1/67 |
| | | | 455/500 |
| 2008/0057916 A1 | 3/2008 | Gamm et al. |
| 2008/0064388 A1 | 3/2008 | Duarte et al. |
| 2008/0085698 A1 | 4/2008 | Gamm |
| 2008/0185772 A1 | 8/2008 | Duarte et al. |
| 2008/0242343 A1 | 10/2008 | Koh et al. |
| 2008/0242362 A1 | 10/2008 | Duarte |
| 2008/0261569 A1 | 10/2008 | Britt et al. |
| 2008/0304631 A1 | 12/2008 | Vilis et al. |
| 2009/0088150 A1 | 4/2009 | Chaturvedi et al. |
| 2009/0103687 A1 | 4/2009 | Peters |
| 2009/0137227 A1 | 5/2009 | Bencheikh |
| 2009/0138439 A1 | 5/2009 | Yeung et al. |
| 2009/0186598 A1 | 7/2009 | Cipoletti et al. |
| 2009/0186599 A1 | 7/2009 | Cipoletti et al. |
| 2009/0287415 A1 | 11/2009 | Buerger et al. |
| 2009/0290688 A1 | 11/2009 | Peters et al. |
| 2010/0166154 A1 | 7/2010 | Peters |
| 2010/0261448 A1 | 10/2010 | Peters |
| 2011/0286343 A1 | 11/2011 | Powell et al. |
| 2012/0120852 A1 | 5/2012 | Morken et al. |
| 2012/0121077 A1 | 5/2012 | Gabay et al. |
| 2013/0024873 A1 | 1/2013 | Hillier |
| 2013/0155889 A1 | 6/2013 | Brownworth et al. |
| 2013/0157663 A1 | 6/2013 | Brownworth et al. |
| 2013/0165114 A1 * | 6/2013 | Lee | H04W 76/025 |
| | | | 455/434 |
| 2013/0225235 A1 | 8/2013 | Elter et al. |
| 2013/0311545 A1 | 11/2013 | Wright et al. |
| 2013/0337802 A1 | 12/2013 | Morken et al. |
| 2014/0029578 A1 | 1/2014 | Milam et al. |
| 2014/0031003 A1 | 1/2014 | Shugart et al. |
| 2014/0044125 A1 | 2/2014 | Rathnam et al. |
| 2014/0105179 A1 | 4/2014 | Kashimba et al. |
| 2014/0113606 A1 | 4/2014 | Morken et al. |
| 2014/0226537 A1 | 8/2014 | Kashimba et al. |
| 2014/0273915 A1 * | 9/2014 | Corley | H04W 4/22 |
| | | | 455/404.1 |
| 2016/0019460 A1 | 1/2016 | Li |
| 2016/0044715 A1 * | 2/2016 | Moodbidri | H04W 4/22 |
| | | | 455/404.1 |
| 2016/0150574 A1 * | 5/2016 | Edge | H04W 76/007 |
| | | | 455/404.2 |
| 2016/0219397 A1 * | 7/2016 | Mayor | H04W 4/02 |
| 2016/0255181 A1 * | 9/2016 | Shaltiel | H04M 1/006 |
| | | | 455/417 |
| 2016/0337831 A1 * | 11/2016 | Piett | H04W 4/22 |

FOREIGN PATENT DOCUMENTS

| | | |
|---|---|---|
| WO | WO-2011115543 A1 | 9/2011 |
| WO | WO-2011149533 A1 | 12/2011 |
| WO | WO-2013170045 A2 | 11/2013 |
| WO | WO-2014110777 A1 | 7/2014 |

OTHER PUBLICATIONS

Wikipedia.org, "Bandwidth.com," (2014).; Retrieved from the Internet on Aug. 21, 2014 at: ; <URL: https://en.wikipedia.org/w/index.php?title=bandwidth.com&printable-yes>.

Wikipedia.org, "Republic Wireless," (2014).; Retrieved from the Internet on Aug. 21, 2014 at:; <https:/en.wikipedia.org/w/index.php?title=Republic_Wireless&printable-yes>.

* cited by examiner

EMERGENCY CALL OVER A DATA NETWORK

CROSS-REFERENCE TO RELATED APPLICATIONS

This application is related to copending U.S. application Ser. No. 15/079,293 entitled "Native Dialer Fall-Back," the entire disclosure of which is expressly incorporated herein by reference.

TECHNICAL FIELD

The present disclosure relates to facilitating an emergency call originated by a device configured to communicate over a data network, including, formatting communications to ensure that the emergency call is routed to an appropriate Public Safety Answering Point (PSAP).

BACKGROUND

Voice over Internet Protocol (VoIP) refers to technologies that provide voice communications services and data communications services (e.g., multimedia sessions) over Internet Protocol (IP) networks, such as the Internet and/or private packet networks. Other terms commonly associated with and used interchangeably with the term "VoIP" include "IP telephony," "Internet telephony," "broadband telephony," and "broadband communications service." An end-customer of an IP telephony provider may obtain a dedicated VoIP or IP telephony-compatible phone, which may be a stationary device (e.g., a hard-wired desk-top computer or telephone) or a mobile device. In another embodiment, an IP telephony customer may have a VoIP or IP telephony application installed onto a standard mobile communication device. For example, an installed IP telephony application may include a SIP (Session Initiation Protocol) client that enables IP telephony calls to be sent and received at a cellular mobile communication device. Typically, the installed IP telephony application indicates the telephone number that the IP telephony provider has assigned to its customer, and calls are originated and received by the customer's mobile device with reference to the assigned telephone number.

IP telephony technology, though, is not able to easily support various telephony features and capabilities that are provided by the Public Switched Telephone Network (PSTN). For example, to support emergency services calls to police, fire, ambulance, etc. (such as by dialing 9-1-1 in the United States), the direct relationship between a telephone number assigned to a land line telephone and the physical geographical location of the land line telephone is exploited in order to automatically provide the physical location of the caller to emergency responders. In IP telephony, though, no such direct relationship is guaranteed to be readily available, as assigned telephone numbers are typically mapped to IP addresses, and the respective physical locations of IP addresses may or may not be automatically tracked by Internet telephony service providers. Further, in some situations, unlike telephony numbers that are assigned to land-line telephones, an IP address and/or assigned IP telephone number may not able to uniquely identify the physical location of a particular device. For example, when a IP telephony connection is a link to a virtual private network of an enterprise, the IP address used in end-user communications may identify the enterprise and not a particular end-user's device, and/or an assigned IP telephone number may be associated with an IP telephony application which may be executing on any one of a number of end-user devices.

SUMMARY OF THE DISCLOSURE

In an embodiment, a mobile device is provided. The mobile device may include an application that includes an application dialer communicatively connected to a wireless communication interface. The application may be configured to determine a geographic location of the mobile device based upon an output from an API supported by an operating system of the mobile device. The application may be further configured to communicate, via the wireless communication interface, with an emergency call router. The data packets forming communications with the emergency call router may utilize a packet header format that indicates the geographic location.

In another embodiment, a method is provided. The method may include receiving, at an application dialer of a mobile communication device, user input indicative of an emergency call. The method may further include determining, by the application dialer, whether or not location services are currently available for the mobile device. When location services are currently unavailable, the method may include releasing control of an origination of the emergency call to a native dialer of the mobile communication device. When location services are currently available, the method may include originating, by the application dialer, the emergency call.

DETAILED DESCRIPTION

Figure 1:
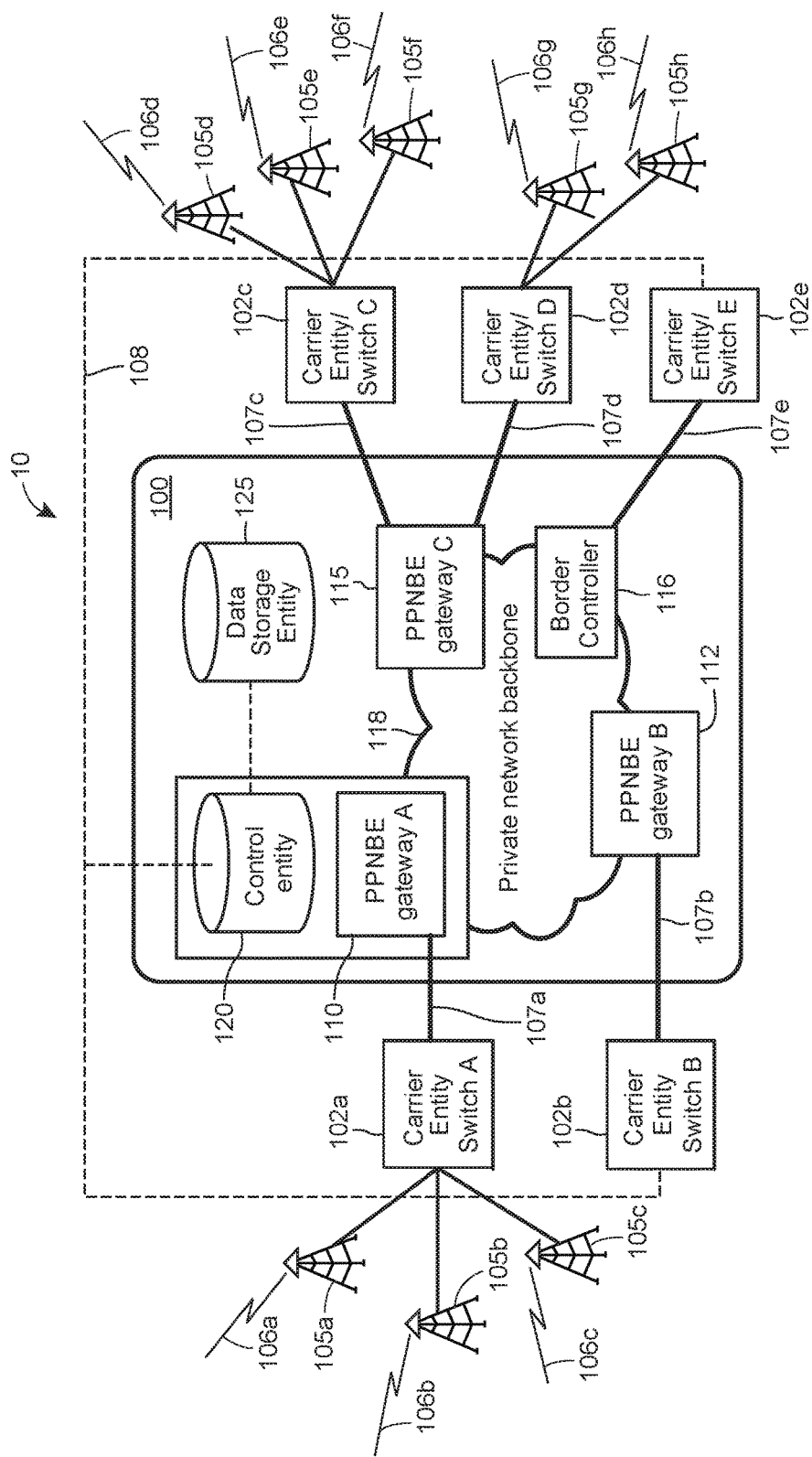
FIG. 1 includes a block diagram of an example architecture that includes a private packet network backbone exchange or switch (PPNBE) and that supports voice and data communications services provided by a PPNBE communications service provider.

A private packet network backbone exchange (PPNBE) service provider may provide voice communications services and data communications services (e.g., multimedia sessions) to end-users or customers. Generally, a private packet network backbone exchange or PPNBE may comprise a single logical switch or exchange that provides "one-hop" routing between communications service providers and/or carriers. As such, a PPNBE service provider may be an enterprise, organization, or entity that provides voice and/or data communications services via a PPNBE. The PPNBE is "private" as it does not include the public Internet or any other public networks, and as it is privately managed, e.g., by the PPNBE service provider. Typically, a private packet network backbone exchange or switch comprises a set of privately managed nodes via which voice and/or data traffic is routed, and a set of gateways that convert traffic between various protocols utilized by origination/destination entities and the packet format utilized by the set of privately managed nodes. Said packet format utilized by the set of privately managed nodes of the PPNBE may correspond to an IP format, and/or may correspond to other types of packet protocols/switching technologies, such as ATM (Asynchronous Transfer Mode). Examples of PPNBEs that may be used in conjunction with the novel techniques described herein may be found in co-owned U.S. Pat. No. 8,284,765 entitled "System and Method of Providing Communications service using a Private Packet Network Backbone Exchange," the entire disclosure of which is hereby incorporated by reference.

While a PPNBE service provider may own, operate, and/or manage private packet network backbone exchanges, typically the PPNBE service provider may not own, operate, and/or manage last-mile wireless networks that are accessible to end-user or customer mobile communication devices. Accordingly, a PPNBE service provider may enter into a business agreement with one or more mobile or wireless network operators so that PPNBE-compatible mobile communication devices utilized by PPNBE service provider customers may obtain access to and be accessed via the wireless spectrum managed by the one or more mobile network operators. As such, from a mobile network operator-centric point of view, the PPNBE service provider may appear as an MVNO. However, from a PPNBE service provider-centric point of view, the PPNBE service provider offers and provides comprehensive voice and data communication devices and services to end-users and customers, and as such views the last-mile wireless networks as only one segment of a larger transport pipe, mechanism, or infrastructure that is utilized to support PPNBE-compatible devices and service offerings. For example, the wireless bandwidth that is managed by the mobile or wireless network operator and utilized by the PPNBE-service provider may serve as a last-mile transport means for PPNBE-compatible communication devices.

A PPNBE service provider may arrange for PPNBE-compatible communication devices to be provided to its end-users or customers. In an embodiment, such PPNBE-compatible mobile communication devices may comprise an off-the-shelf, OEM (Original Equipment Manufacturer), or standard mobile communication device that is compatible with the last-mile wireless networks over which the PPNBE service provider has secured bandwidth for use by its end-users or customers. For example, the off-the-shelf, OEM, or standard mobile communication device may include one or more transceivers/antennas that are compatible with the wireless technologies and protocols utilized in the last-mile wireless networks (e.g., TDMA, GSM, CDMA, LTE, Wi-Fi, etc.).

However, in addition to being configured for one or more wireless technologies and protocols, the off-the-shelf, OEM, or standard mobile communication device may also be particularly configured for PPNBE communications services. For example, a PPNBE-related application (also interchangeably referred to herein as a "PN application") that is executable by a processor of a mobile communication device may be stored on a memory of the mobile communication device, thereby particularly configuring the mobile communication device to be compatible with PPNBE communications services. The PN application may be installed at the mobile communication device during the factory installation process, or the PN application may be side-loaded or downloaded onto the mobile communication device (and thereby be installed at the mobile communication device) at some time after its factory installation has completed. In an embodiment, the user interface provided by the PN application may overlay, override, replace, hide, and/or delete one or more user interfaces that are native to the off-the-shelf, OEM, or standard mobile communication device. For example, instead of displaying icons for and causing the utilization of native applications for texting, making phone calls, web browsing, and other such communications applications, the PN application may display its own icons corresponding to such communications applications via which the functionality for texting, making phone calls, web browsing, and other such communications applications may be provided to an operator of the mobile communication device.

FIG. 1 includes a block diagram of an example architecture 10 that supports PPNBE communications services, e.g., voice and/or data communications services provided by a PPNBE communications service provider. The architecture 10 may include a private packet network backbone exchange or switch (PPNBE) 100, which may be connected to various communications equipment of one or more other communications service providers or carrier entities. In FIG. 1, for example, the PPNBE 100 is connected to the equipment 102a-102e corresponding to Carrier Entities A, B, C, and D. Typically, but not necessarily, the PPNBE 100 is owned, operated, and/or managed by the PPNBE service provider.

A "carrier entity," as used herein, may be a carrier or service provider that has agreements with its end-users, subscribers, or customers (which may be individual people or may be other carrier entities) for communications service. A carrier entity may own and operate the equipment to which a respective customer's Personal Electronic Device or PED (e.g., mobile communication or computing device, tablet, smart device, e-reader, stationary communication or computing device, etc.) may connect and receive communications services. Alternatively, a carrier entity may not have any individual end-users, customers, or subscribers at all, such as carrier entities that operate IXCs (Inter-Exchange Carrier) or tandem exchanges. In some cases, a carrier entity may not own specific communications equipment, but may still operate the specific communications equipment by leasing from or entering into an agreement with an owning entity of the equipment for use of the specific communications equipment or portions thereof. For example, a carrier entity that provides wireless service may procure the rights to route calls over the network of a long distance carrier in order to provide long distance service to wireless subscribers. Or, in another example, a CLEC (Competitive Local Exchange Carrier) may procure rights to send and receive traffic through an access tandem owned by an RBOC (Regional Bell Operating Company or Regional Holding Company). Thus, a "carrier entity," as used herein, may be an entity that owns, controls, or operates communications equipment and/or provides communications service over its communications equipment.

As depicted in FIG. 1, Carrier Entity A is a wireless or mobile network operator. The wireless or mobile network of Carrier Entity A includes one or more wireless switches (represented in FIG. 1 by the wireless switch 102a) that are in communicative connection with the PPNBE 100 via one or more links 107a, and that are in communicative connection with various locations at which respective wireless transceivers/antennas (represented in FIG. 1 by the transceiver/antennas 105a, 105b, and 105c) are installed. The wireless transceivers/antennas 105a-105c may be installed at cell sites, microcells, picocells, hotspots, etc., for example, and may provide respective wireless links 106a, 106b, 106c to which users' PEDs may connect. For discussion purposes herein, Carrier Entity A and the PPNBE service provider have a business agreement that allows the communications of PEDs operated by the end-users or customers of the PPNBE service provider to be transported over the last-mile wireless spectrum or links 106a, 106b, 106c, the wireless transceivers/antennas 105a, 105b, 105c, and the wireless switches 102a that are owned, operated, and/or managed by Carrier Entity A. Carrier Entity A may have its own end-users or customers for its wireless communications services.

Carrier Entity C may be a different wireless or mobile network operator, and may not have any business agreement with the PPNBE service provider. The wireless network of Carrier Entity C may include a wireless switch 102c that is in communicative connection with the PPNBE 100 via one or more links 107c, and that is communicative connection with various locations at which respective wireless transceivers/antennas 105d, 105e, 105f that provide last-mile wireless links 106d, 106e, 106f are installed. The wireless network of Carrier Entity C may also include a wireless switch 102d that is in communicative connection with the PPNBE 100 via one or more links 107d, and that is in communicative connection with various locations at which respective wireless transceiver/antennas 105g and 105h that respectively provide last-mile wireless links 106g and 106h are installed. Carrier Entity C may have its own end-users or customers for its wireless communications services.

Of course, the number of wireless service carrier entities, their respective wireless switches, their respective wireless transceiver/antennas, and their respective wireless links/spectrum shown in FIG. 1 is for illustrative purposes only. The PPNBE 100 may be communicatively connected to any number of wireless switches (and accordingly, to any number of wireless transceiver/antennas and last-mile wireless links) of any number of wireless service providers, each of which may or may not have a business agreement with the PPNBE service provider.

The PPNBE 100 may additionally or alternatively be communicatively connected with other types of carrier entities. For example, in FIG. 1, Carrier Entity D is depicted as a VoIP or IP telephony service provider, whose respective switch 102e utilizes a SIP connection 107e to communicatively connect to the PPNBE 100. Other types of carrier entities or communications service providers are generically represented in FIG. 1 by Carrier Entity B, and may include, for example, inter-exchange carriers, international gateway providers, Local Exchange Carriers, Competitive Local Exchange Carriers, cable service providers, DSL (Digital Subscriber Line) service providers, satellite communications service providers, other types of high bandwidth/broadband service providers, PBX (Private Branch Exchange) owners or operators, tandem exchange providers, and/or other types of communications service providers. Generally, switches or exchanges 102b that are owned, operated, and/or managed by Carrier Entity B may be communicatively connected to the PPNBE 100 via one or more respective links 107b.

Each carrier entity A-D may communicatively connect to the PPNBE 100 using at least two types of communication paths. Paths or channels carrying communication traffic, call content, and/or data content are denoted in FIG. 1 by the heavy thick lines 107a, 107b, 107c, 107d, and 107e. Communication traffic channels 107a-107e may carry voice traffic, data traffic, a combination of the two, or other types of communication traffic using any known communication traffic protocol. Paths or channels carrying signaling may be included in an out-of-band signaling network 108, such as an SS7 network or other type of signaling network, or may be in-band signaling over connections 107a-107e. In some embodiments, one or more of the connections 107a-107d between the equipment 102a-102e of carrier entities and the PPNBE 100 may be a TDM (Time Division Multiplex) connection. In some embodiments, one or more of the connections (107a-107e) may be a VoIP (Voice over Internet Protocol) or other type of broadband connection. For example, in FIG. 1, the equipment 102e of Carrier Entity D may be in communication with the PPNBE over a VoIP-type connection 107e using SIP (Session Initiation Protocol). In some embodiments (not shown), a signaling path 108 and a communication traffic path 107a-107e may be implemented over an integral physical medium, such as an optical cable.

Call traffic may access the private packet network backbone exchange 100 via a gateway 110, 112, 115, or, in the case of VoIP connection such as SIP, a network element 116 such as a session border controller gateway. As used herein, the term "PPNBE gateway" is not limited to mean a gateway of any particular technology, but may include gateways 110, 112, 115, 116 that may support any type of communication technology, for example, a TDM- and/or IP packet-supporting gateway. Call traffic may then traverse a private network backbone 118 to an appropriate terminating PPNBE gateway (110, 112, 115, 116), and may be routed from the appropriate terminating PPNBE gateway (110, 112, 115, 116) of the private packet network backbone exchange 100 to the appropriate carrier entity switch (102a-102e) corresponding to the called party. It is important to note that PPNBE gateways (110, 112, 115, 116) do not serve the same function as local access gateways of other types of local access networks, such as VoIP or cable telephony gateways. A PPNBE gateway 110, 112, 115, 116 may serve as an interface point from the PSTN or other carrier or local service provider network into the private IP backbone 118 of the private packet network backbone exchange 100. The PPNBE gateways 110, 112, 115 and 116 may be operated, owned, and/or controlled by the PPNBE service provider, i.e., a service provider that operates, owns and/or controls the private packet network backbone exchange 100 itself. Other carrier networks may have local access gateways that they self-manage and control, and such local access gateways that are managed and controlled by other networks may interface with the PPNBE gateways 110, 112, 115 and 116. For example, a switch or exchange of a particular carrier entity (e.g., the carrier entity switch or exchange 102b) may communicatively connect to a PPNBE gateway B (e.g., the gateway 112) via a VoIP gateway, a cable telephony gateway, a wireless system gateway, etc. The local access gateways that are managed and controlled by other service providers, however, are not the same entities as the PPNBE gateways 110, 112, 115, 116 of the private packet network backbone exchange 100, and are not shown in FIG. 1.

As previously discussed, the private network backbone 118 may include a set of privately managed nodes (not shown) to route packet call traffic. Each PPNBE gateway (110, 112, 115, 116) may convert call traffic from the protocol or format used by the originating carrier entity exchanges or switches (102a-102e) into a packet format used by the set of privately managed nodes in the private network backbone 118. In some embodiments, the set of privately managed nodes may communicate using a packet format corresponding to an Internet Protocol format (IP) and/or other suitable packet format. Packets may be routed across the privately managed nodes in the private network backbone 118 to the PPNBE gateway corresponding to the carrier of the called party (110, 112, 115, 116), where the packets may be converted into a format understood by the corresponding terminating carrier entity's switch or exchange (102a-102e). As the private network backbone 118 is not the public Internet and is privately managed, the number of nodes and routing of packets within the network 118 may be engineered and controlled to maximize call quality and minimize delay. Also, as the private network backbone 118 is not the public Internet and is privately managed, the access, security and privacy of calls are more easily controlled.

In the private packet network backbone exchange 100, call control may be performed by a logical call control entity 120. The control entity 120 may include one or more computers, servers, or cloud computing devices, or other computing devices having a memory and having the ability to interface with a signaling network 108. Control entity 120 may provide call control as well as features, services, administration, and other types of capabilities needed for communications service. Control entity 120 may be represented to the PSTN and other networks as a single logical point code, for example. For some calls, call control entity 120 may send and receive signaling via the out-of-band signaling network 108. For other calls, control signals may be received in-band at a PPNBE gateway 110, 112, 115, 116, and in these situations, in-band control signals may be delivered to and received from the call control entity 120 via the private network backbone 118.

Additionally, the PPNBE 100 may include a single, logical database 125 that is accessible to the call control entity 120. The single, logical routing database 125 may store or include information about one or more point codes by which the PPNBE may be identified to other exchanges, for example. Additionally, the database 125 may store or include information corresponding to various end-user or customer accounts of the PPNBE service provider, registration records of various PEDs of the PPNBE service provider's end-users and/or customers, and other information that the call control entity 120 and/or the PPNBE 100 may utilize for providing PPNBE communications services. Although FIG. 1 depicts the single logical database 125 is being a unitary data storage area, the logical routing base 125 may comprise one or more local and/or remote computer-readable, non-transitory storage media or data storage entities, which may be physically located across multiple locations. However, the database 125 may have the appearance as a single logical routing database.

Figure 2:
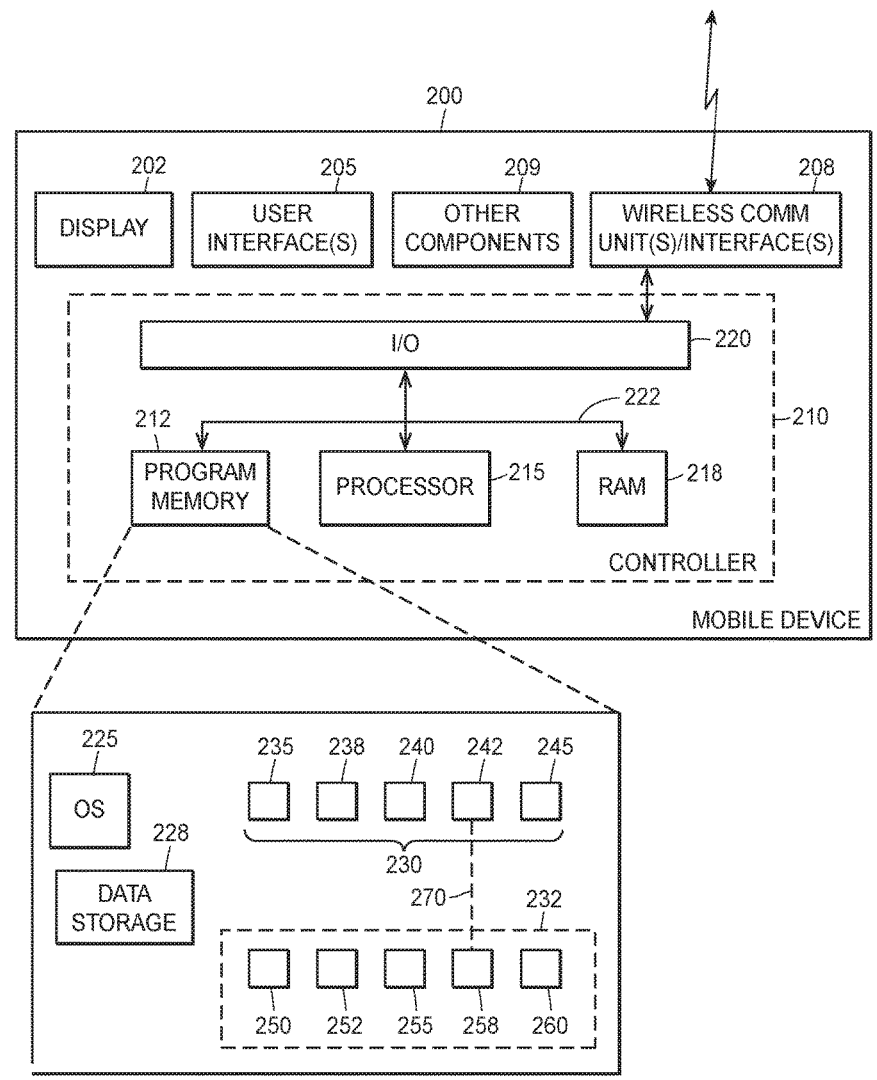
FIG. 2 includes a block diagram of an example mobile communication device that is configured for PPNBE communications services.

FIG. 2 depicts a block diagram of an example Personal Electronic Device or mobile communication device 200 configured for PPNBE-provided communications service. The mobile communication device 200 may be compatible with the architecture 10 and the PPNBE 100 of FIG. 1, for example, and is discussed herein with simultaneous reference thereto for ease of discussion and not limitation purposes.

The mobile device 200 may include a display 202, a user interface 205 (which may be integral with the display 202, such as when the display 202 and the user interface 205 are a touch-screen interface), a wireless communication unit 208, and a controller 210. The wireless communication unit 208 may be configured to communicate using the one or more wireless technologies supported by the wireless or mobile network operator with which the PPNBE has a business agreement, e.g., Carrier Entity A of FIG. 1. For example, the wireless communication unit 208 may include transceivers and antennas that support TDMA, GSM, CDMA, LTE, and/or other cellular wireless technologies. Additionally, the wireless communication unit 208 may support one or more other wireless technologies, such as Wi-Fi, Wi-Max™, Bluetooth®, NFC (Near Field Communications), etc. The mobile device 200 may include one or more other components (which are generally represented by the block 209) such as a GPS or geo-location unit, one or more sensors (e.g., spatial sensors, light sensors, biometric sensors, etc.), a camera interface, an audio interface, a port to receive a charging cable, a port to receive a headset or other external device, etc.

The controller 210 may include a program memory 212, a processor 215, a random-access memory (RAM) 218, and an input/output (I/O) circuit 220, all of which may be interconnected via an address/data bus 222. The program memory 212 may include, for example, an operating system 225, a data storage 228, and a plurality of native software applications and/or routines 230, and a PPNBE-compatible (e.g., "PN") application 232. The operating system 225, for example, may include one of a plurality of mobile platforms such as the iOS®, Android™, Palm® webOS, Windows Mobile/Phone, BlackBerry® OS, or Symbian® OS mobile technology platforms, developed by Apple® Inc., Google® Inc., Palm® Inc. (now Hewlett-Packard Company®), Microsoft Corporation®, Research in Motion® (RIM), and Nokia®, respectively. The data storage 228 may include data such as user profiles, application data and/or routine data for the plurality of applications and routines 230, 232, and other data necessary to interact with the user, other components of the wireless device 200, and/or remote systems. In some embodiments, the controller 210 may also include, or otherwise be communicatively connected to, other data storage mechanisms (e.g., one or more hard disk drives, optical storage drives, solid state storage devices, etc.) that may reside within the mobile device 200.

It should be appreciated that although FIG. 2 depicts only one processor 215, the controller 210 may include multiple processors 215. Similarly, the memory of the controller 210 may include multiple RAMs 218 and multiple program memories 212. The controller 210 may implement the RAM(s) 218 and the program memories 212 as semiconductor memories, magnetically readable memories, and/or optically readable memories, for example. Further, although FIG. 2 depicts the I/O circuit 220 as a single block, the I/O circuit 220 may include a number of different types of I/O circuits. Further, the one or more processors 215 may be adapted and configured to execute any one or more of the plurality of software applications and/or routines 230, 232 residing in the program memory 212, in addition to other software applications and/or routines.

With respect to the applications and/or routines 230, 232, an embodiment of the mobile device 200 includes a computer usable storage medium (e.g., standard random access memory (RAM), an optical disc, a universal serial bus (USB) drive, or the like) having computer-readable program code corresponding to the applications and/or routines 230, 232 embodied therein, wherein the computer-readable program code is adapted to be executed by the processor 215 (e.g., working in connection with the operating system 225) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Turning now to the plurality of native applications and/or routines 230, at least some of the plurality of native applications and/or routines 230 may be communications-related, each of which may be implemented as a series of machine-readable instructions for performing various tasks associated with receiving information at, displaying information on, and/or transmitting information from the mobile device 200, e.g., via the display 202, the user interface 205, and/or the wireless communications unit 208. Native applications and/or routines 230 are generally referred to herein as "native" as they typically are included with the purchase of the mobile device 200, and typically are factory installed onto the mobile device 200, e.g., by the device's manufacturer or other party. For example, one of the plurality of native applications and/or routines 230 may be a native web browser 235, such as, for example, Apple's Safari®, Google Android™ mobile web browser, Microsoft Internet Explorer® for Mobile, Opera Mobile™, that may be implemented as a series of machine-readable instructions for receiving, interpreting, and displaying web page information from remote servers while also receiving inputs from the user. Others of the plurality of native applications and/or routines 230 may include a native texting or messaging application 238, a native email application 240, and a native dialer application 242 via which a user is able to originate phone calls. Of course, other native applications and/or routines 245 (whether communications-related or not) may be installed or resident on the mobile device 200.

It should be appreciated because the native applications 230 are generally included as part of the operating system 225, the native applications 230 may have access to APIs not exposed to 3$^{rd}$ party developers. For example, due to safety concerns, the operating system 225 typically does not expose APIs related to emergency calling. Thus, non-native applications, such as the PN application 232, may be restricted in their ability to fully act as a substitute for the native applications 230.

Generally speaking, the native dialer 242 may be compatible with and may utilize mobile communications service provider spectrum and equipment (e.g., links 106a-106h, wireless RF transceivers/antennas 105a-105h, and wireless switches 102a-102e) for originating and receiving calls and other data traffic. As such, calls originated by the native dialer 242 of the mobile communication device 200 may be routed to respective destination parties via the mobile communications service providers and their respective equipment/networks, and not via the PPNBE 100. In an example (not shown), a call originated by the native dialer 242 of the mobile communication device 200 may utilize one or more telecommunications RF protocols supported by the last-mile wireless network links (such as TDMA, CDMA, GSM, LTE, etc.). The call signaling and traffic may be transmitted over wireless spectrum 106a-106h, received at a transceiver 105a-105h, and processed/routed towards a respective called party or destination via one or more wireless switches 102a-102e. The call origination generated by the native dialer 242 may be transmitted from the wireless switches 102a-102e directly to the PSTN using one or more standard telecommunications protocols (such as SS7, ISUP, etc.), and without utilizing the PPNBE 100, and as such may have the appearance of a call generated by a PED of a customer or end-user of the mobile network operator of the last-mile wireless network.

For scenarios in which the last-mile mobile network provider is not a cellular mobile service provider but rather is a Wi-Fi or other data network mobile service provider, the content of call signaling and traffic generated by the mobile device 200 may be transmitted over the data network mobile service provider's spectrum and equipment, and may be directly delivered from the data network mobile service provider's equipment to the Internet using an IP or other suitable packet protocol, and without utilizing the PPNBE 100.

Turning now to the PPNBE-compatibility of the mobile device 200, the PN application 232 that is stored on and executed at the mobile device 200 may particularly configure the mobile device 200 to operate with and be compatible with the PPNBE 100 for performing various communications capabilities, such as making phone calls, texting, etc. In an embodiment, the PN application 232 may register with the PPNBE 100 (e.g., upon initialization, after waking up from sleep, and/or at other times), and the PPNBE 100 may maintain an indication of an IP address corresponding to the registered PN application 232. As such, the registered IP address of the PN application 232 may correspond to a location at which the PN application 232 (and therefore, the mobile device 200) may be reached, and consequently the PPNBE 100 may route incoming and outgoing communications packets to/from the PN application 232 via the registered IP address.

In an embodiment, the PN application 232 may be implemented as a series of machine-readable instructions for performing the various tasks associated with receiving information at, displaying information on, and/or transmitting information from the mobile device 200, e.g., via the display 202, the user interface 205, and/or the wireless communications unit 208. For example, the PN application 232 may include one or more capabilities which may be implemented by sub-routines and/or sub-applications, such as a PN web browser 250, a PN texting or messaging capability 252, a PN email capability 255, and/or a PN dialer or telephony capability 258 via which a user of the device 200 is able to originate phone calls. Of course, other PN capabilities 260 may be provided by the PN application 232. Although the capabilities 250-260 may be referenced individually for the sake of clarity, any actions performed by the capabilities 250-260 may be generally attributable to the PN application 232. The PN application 232 and its capabilities 250-260 may be installed onto the device 200 during factory installation, or the PN application 232 and its capabilities 250-260 may be installed or loaded onto the mobile device 200 after the native applications and/or routines 230 have been installed or loaded onto the mobile device 200. For example, the PN application 232 and its capabilities 250-260 may be side-loaded and/or downloaded onto the device 200 after the device 200 has left the factory. For example, the PPNBE service provider and/or the end-user may side-load and/or download at least some of the PN applications and/or routines 232 onto the mobile communication device 200 after the device 200 has left the factory.

In an embodiment, the PPNBE service provider may assign a particular PN telephone number to the mobile device 200, and the mobile device 200 may be identified to other parties for communications purposes via its assigned PN telephone number. For example, the PN telephone number of the mobile device 200 may be utilized as an originating telephone number in call origination messages, and/or the PN telephone number of the mobile device 200 may be a number from which texts may be originated and at which texts may be received. Thus, while the mobile device 200 may be identified to the PPNBE 100 by a registered IP address corresponding to the PN application 232 executing thereon, the mobile device 200 may be identified to third-party communication devices and/or systems by its assigned PN telephone number.

On the other hand, the native dialer 242 may not have any knowledge of the PN telephone number assigned to the mobile device 200, and accordingly, calls originated by the native dialer 242 may exclude the PN telephone number and identify the mobile device 200 via another number corresponding to the mobile device 200, such as an IMSI (International Mobile Subscriber Identity), an IMEI (International Mobile Equipment Identity) or MEID (Mobile Equipment Identifier), a serial number such as an ESN (Electronic Serial Number), or another number corresponding to the mobile device 200.

In an embodiment, calls originated by the PN application dialer 258 may be transported via the equipment of the mobile network operator with which the PPNBE service provider has a business relationship (e.g., in FIG. 1, the wireless links 106a-106c, the wireless transceivers/antennas 105a-105c, and the wireless switch 102a of Carrier Entity A). The content of the call signaling and traffic transmitted over the mobile service provider's equipment may be maintained in the IP or packet protocol format as originated by the PN application dialer 258. Separate from the content, the packets may include a header that indicates information that supplements the content. For example, the header may include an origination address, a destination address, a time stamp, indications of a format of the content, or a length of the packet or header.

That said, the packets may be wrapped, encapsulated, or otherwise transformed to be compatible with an RF telecommunication protocol supported by the equipment of Carrier Entity A for transport over the spectrum and equipment of Carrier Entity A. For example, the payload of traffic transported over the spectrum and equipment of Carrier Entity A may comprise the original packets including the call signaling and traffic generated by the PN application dialer 248. Prior to delivery to the PPNBE 100 via the link 107a, the packets may be restored to their original format as generated by the PN application dialer 258.

When the mobile service provider is not a cellular mobile service provider but rather is a Wi-Fi or other data network mobile service provider, the content of call signaling and traffic transmitted over the data network mobile service provider's spectrum and equipment may not require any wrapping or packaging at all, or may require minimum wrapping or packing to conform with the data network service provider's protocols and systems.

In an embodiment, the communications capabilities provided by the PN application 232 may take precedence over the native communications-related applications and/or routines 230. That is, the communications capabilities provided by the PN application 232 may be the default communications capabilities at the mobile device 200. As such, at the display 202 and/or user interface 205 of the mobile device 200, indications of the communications capabilities provided by the PN application 232 (e.g., icons for the application dialer, text message application, etc.) may be presented so that they are visible, available, and accessible to the user, while indications of the native communications capabilities provided by the native applications and/or routines 230 may be hidden or otherwise not made available to the end-user. In some embodiments, a user of the mobile device 200 is not even aware of the presence of the native communications-related applications and/or routines installed on the mobile device 200, for example, when the PN application 232 is factory-installed or is installed prior to the user taking possession of the mobile device 200. In some embodiments, an end-user is prevented from deleting the PN application 232.

As such, in an example scenario, when an end-user desires to make a telephone call using a mobile device 200 at which the communications capabilities of the PN application 232 are the default communications applications displayed on the user interface 205, the end-user may launch or activate the PN application dialer 258 via which the user may indicate a particular telephone number to which the user desires to place a call. For example, the user may enter digits corresponding to a particular telephone number at a virtual keypad displayed on the mobile device's touch screen, the user may select a "favorite" or short cut that has been previously defined to represent the particular telephone number, the user may provide a verbal command to call the particular telephone number, etc.

Continuing with this example scenario, and referring simultaneously to FIGS. 1 and 2, the PN application dialer 258 may cause a call origination to be transmitted, via the wireless communication unit 208 of the mobile device 200, over an RF (Radio Frequency) wireless link to an appropriate wireless transceiver/antenna at a wireless tower, say, for example, the wireless link 106a and the transceiver/antenna 105a of the system 10 shown in FIG. 1. The wireless spectrum and infrastructure 106a, 105a, 102a via which the call origination is transmitted or delivered to the PPNBE 100 may be owned and operated by another carrier entity (e.g., Carrier Entity A) with which the PPNBE service provider may have an agreement for wireless bandwidth and equipment usage. The call origination may be of an IP or packet format, and may indicate therein the digits of the particular telephone number as the destination or called telephone number. Further, the call origination may be wrapped, encapsulated, or otherwise packaged as payload to be transported over the wireless link 106a and other wireless service provider infrastructure, while maintaining its original IP or packet format.

The call origination may be routed via the wireless link 106a, the wireless tower 105a, the wireless switch 102a, and the link 107a to the PPNBE 100. In an embodiment, the wrapper or packaging used to transport the original IP packet or format may be discarded or reversed prior to the call origination being delivered to the PPNBE 100 via the link 107a. The call control entity 120 of the PPNBE 100 may route the call origination, based on at least the called telephone number indicated therein, to the appropriate PPNBE gateway 110, 112, 115, 116 via which the call origination may exit the PPNBE 100 and be delivered to the appropriate carrier entity for transmission towards the called telephone number. Other communications (e.g., text messages, etc.) that are originated at the PPNBE-compatible device 200 via the PN dialer application 258 may be routed in a similar manner via the PPNBE 100 to its destination party or number.

Thus, as shown in the above example scenario, the PPNBE service provider may provide communications services to the end-user operating the mobile device 200. Note that the use of the wireless equipment segment (e.g., the RF wireless link 106b, the wireless tower 105a, and wireless switch 102a, and link 107a) via which the call origination is routed in this example scenario is made possible due to the business relationship between the PPNBE service provider and the wireless service provider that owns/operates the wireless spectrum and equipment 106ba, 105b, 102a. As such, the wireless spectrum and equipment segment 106a, 105a, 102a is merely a transport mechanism or transport pipe for the communications of the PPNBE-compatible mobile device 200.

The location of the mobile device 200 as known to the PPNBE 100 for routing purposes is indicated by the registered IP address of the PN application 232, such as previously discussed. Notably, though, while the registered IP address of the PN application 232 may map to, and thus definitively be indicative of, the assigned PN telephone number of the mobile device 200, for at least reasons such as those previously discussed, the registered IP address is not able to accurately indicate an actual physical location of the mobile device 200 to the PPNBE 100. For example, the registered IP address of the PN application 232 may be indicative of an enterprise virtual private network, but not of a current physical location of the particular device 200 in particular. This lack of accuracy in the correlation between the registered IP address of the PN application 232 and the actual physical location of the mobile device becomes problematic for certain telephony capabilities such as emergency services (e.g., in the U.S., 9-1-1 calls) in which third-party equipment is configured to determine a physical location of the calling device is directly from indicia included in the call origination. Other types of service numbers (e.g., 3-1-1, 4-1-1, and/or other service numbers that are typically designated, assigned, or defined by one or more regulatory bodies) may be similarly affected. Thus, a solution is needed to enable the mobile device 200 to originate service calls and other calls in a manner that is compatible and consistent with the PSTN. The novel techniques, systems, apparatuses, and methods described herein not only address these drawbacks as well as provide additional benefits, which are described in more detail below.

Figure 3:
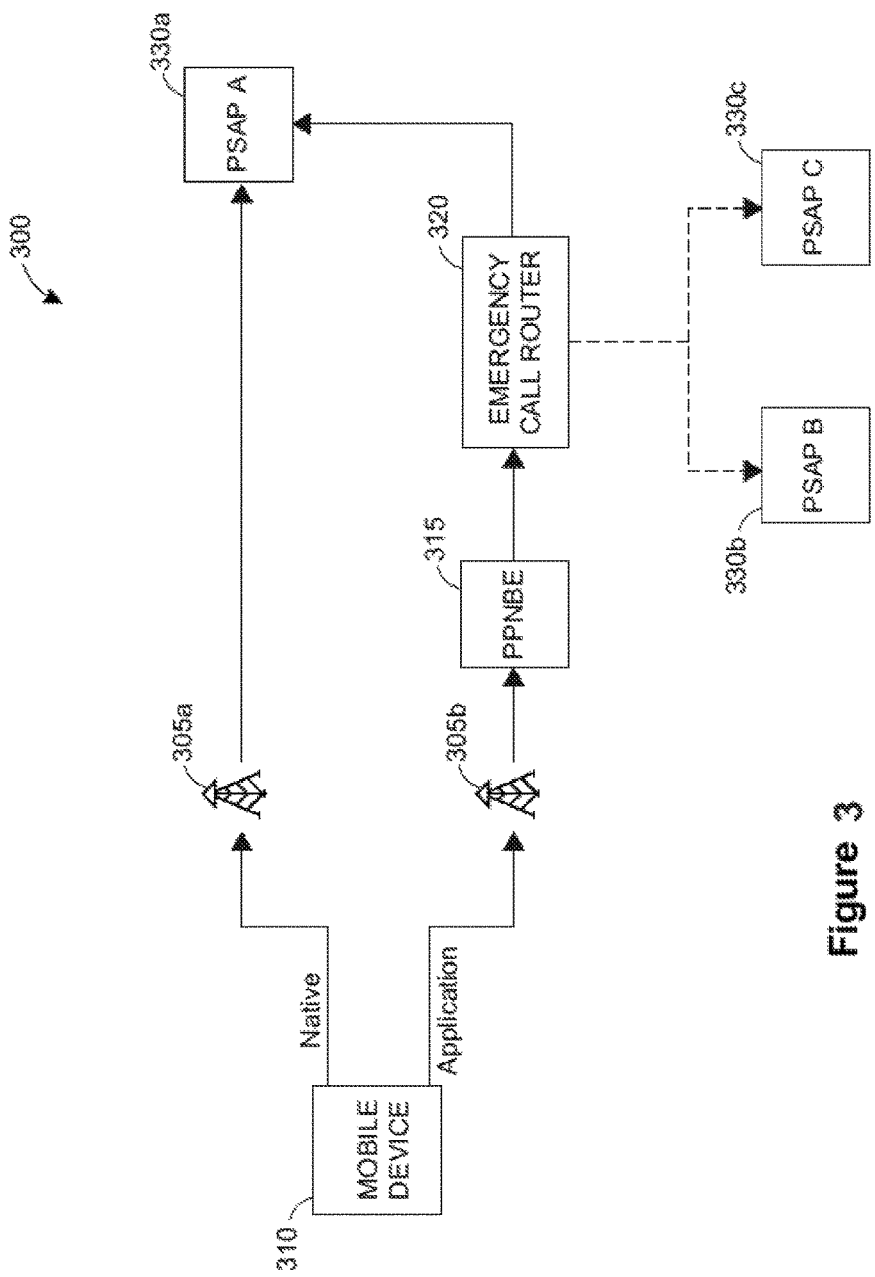
FIG. 3 includes a block diagram of an example environment for originating an emergency call to a PSAP.

FIG. 3 depicts an example environment 300 in which a mobile device 310 (such as the mobile device 200 of FIG. 2) originates an emergency call, such as by dialing 9-1-1. As depicted in the environment 300, the origination path may vary between originating the emergency call via a native dialer of the mobile device 310 (such as the native dialer 242 of FIG. 2), and originating the emergency call via an application dialer of the mobile device 310 (such as the PN application dialer 258 of FIG. 2). To this end, the upper path depicted in FIG. 3 indicates an example emergency call origination path utilizing the native dialer; whereas, the lower path depicted in FIG. 3 indicates an example emergency call origination path utilizing the application dialer. Regardless of which dialer is used to originate the emergency call, the emergency call should be routed to a PSAP that serves the area in which the mobile device 310 is currently located. In the environment 300, this is the PSAP 330a. Said another way, when the emergency call is originated by the mobile device 310, the emergency call should be routed to the PSAP 330a, and not another PSAP (such as PSAPs 330b and 330c) that serves an area in which the mobile device 310 is not currently located.

Beginning with the upper origination path, when emergency calls are originated via the native dialer, the native dialer may cause mobile device 310 to transmit an emergency call origination message. This emergency call origination message may by carried and/or routed via the wireless spectrum and equipment owned and/or operated by a wireless service provider, including a transceiver/antenna 305a (such as one of the transceivers/antennas 105a, 105b, or 105c of FIG. 1). In some scenarios, the wireless service provider knows the fixed physical locations of each transceiver/antenna operated by the wireless service provider, including the transceiver/antenna 305a. Utilizing this knowledge, the wireless service provider may establish a routing map that identifies the PSAP to which each transceiver/antenna operated by the wireless service provider routes emergency call origination messages. In these scenarios, the transceiver/antenna 305a may be configured by the wireless service provider to route all emergency call originations to the PSAP 330a. Accordingly, when the transceiver/antenna 305a receives the emergency call origination message from the mobile device 310, the transceiver/antenna 305a may route the emergency call origination message to the PSAP 330a.

Turning to the lower origination path, when emergency calls are originated via the application dialer, the application dialer may cause mobile device 310 to transmit an emergency call origination message. In an embodiment, the emergency call origination message is a SIP invite message. This emergency call origination message may be carried and/or routed via the wireless spectrum and equipment owned and/or operated by a wireless service provider with which a PPNBE 315 (such as the PPNBE 100 of FIG. 1) has a business relationship may be utilized as a transport mechanism or pipe. For example, the equipment may include a transceiver/antenna 305b (such as a different one of the transceivers/antennas 105a, 105b, or 105c of FIG. 1). However, unlike the wireless service provider corresponding to the native dialer, the wireless service provider corresponding to the PPNBE 315 may not be able to determine a physical location of the mobile device with sufficient accuracy.

Accordingly, the wireless service provider corresponding to the PPNBE 315 may utilize an emergency call router 320 to route the emergency call origination message to the PSAP 330a. According to aspects, the emergency call router 320 may include a database that stores geographic and/or physical location data received from mobile devices configured to utilize the PPNBE 315. Based on the stored location data, the emergency call router 320 may determine which PSAP serves the area that covers the respective locations indicated by the stored location data. As the emergency call router 320 receives new location data from the mobile device 310, the emergency call router 320 may analyze the location data to determine whether the location data indicates that the mobile device 310 is in a location served by a PSAP that is not currently associated with the mobile device 310 in the database.

According to aspects, when the PPNBE 315 receives the emergency call origination message from the mobile device 310, the PPNBE 315 may forward and/or route the emergency call origination message to the emergency call router 320. The emergency call router 320 may then query the database interconnected therewith to determine that the emergency call origination message should be routed to the PSAP 330a. Subsequently, the emergency call router 320 may then forward and/or route the emergency call origination message to the PSAP 330a. It should be appreciated that although the emergency call router 320 is depicted as a separate entity as the PPNBE 315, in some embodiments the emergency call router 320 may be a component of the PPNBE 315. Further, although the environment 300 only depicts a single emergency call router 320, in some embodiments, multiple emergency call routers 320 may be implemented. For example, to decrease the emergency call establishment time, some wireless service providers may divide their service area into regions (e.g., the Midwest, Northern Illinois, greater Chicagoland, etc.). Accordingly, each of these regions may correspond to its own emergency call router 320 to route emergency call origination messages that originated within the corresponding region.

For the emergency call router 320 to be able to route the emergency call origination message to the PSAP 330a, as opposed to, say, the PSAPs 330b or 330c, the emergency call router 320 may need to receive location data corresponding to the mobile device 310. To this end, the application dialer of the mobile device 310 and the emergency call router 320 may utilize a particular packet configuration for communications therebetween. In particular, the mobile device 310 may be configured to utilize a packet header format that indicates geographic location data (e.g., latitude and longitude) when communicating with the emergency call router 320. Similarly, the emergency call router 320 may be configured to interpret and/or extract the geographic location data included in a packet header. It should be appreciated that the mobile device 310 and the emergency call router 320 may communicate outside the context of originating and/or maintaining an emergency call. As an example, the mobile device 310 may transmit an update message to the emergency call router 320 whenever the mobile device 310 connects to a new network. As another example, the emergency call router 320 may periodically poll the mobile device 310 if no communications have been received for a threshold duration (e.g., every five minutes). In an embodiment, the packet header format indicating the geographic location is utilized for these communications as well.

In an embodiment, as part of generating a packet for transmission to the emergency call router 320, the application dialer may utilize an API supported by the operating system of the mobile device 310 to determine the current geographic location of the mobile device 310. For example, the geographic location may be determined based upon an output of a class method (e.g., getLastLocation). As another example, the geographic location may be determined based upon the output of a request to retrieve a class attribute of a location object that the operating system periodically updates to indicate the most recent location data. Regardless of the particular API utilized to determine the geographic location data, the application dialer may incorporate the geographic location data in the packet header of the packet that will be transmitted to the emergency call router 320.

According to certain aspects, including the location data within the packet header of data packets transmitted from the mobile device 310 to the emergency call router 320 may improve the performance of the overall emergency call environment. To this end, including the geographic location data in the packet headers may reduce the overhead required to transmit the geographic location data. Said another way, the mobile device 310 may be capable of transmitting the geographic location data without dedicating an entire data packet (or series of data packets) to the communication of the geographic location data. Furthermore, because the emergency call origination message may include the geographic location data within the header of a SIP packet, the mobile device 310 does not need to utilize a second stack (e.g., HTML) to incorporate the geographic location data. As a result, the emergency call router 320 may be capable of determining the geographic location of the mobile device 310 more quickly than via traditional solutions. Moreover, as the geographic location data is, in some scenarios, analyzed to route data packets associated with an emergency call, utilizing the packet header solution described herein may enable emergency calls to be established faster, and with less latency, than traditionally possible.

It should be appreciated that when location services of the mobile device 310 are unavailable, the application dialer may be unable to include the geographic location data within the header of a data packet. Accordingly, when an emergency call is originated via the application dialer while location services are unavailable, it may be preferable to release the emergency call origination to the native dialer.

Figure 4:
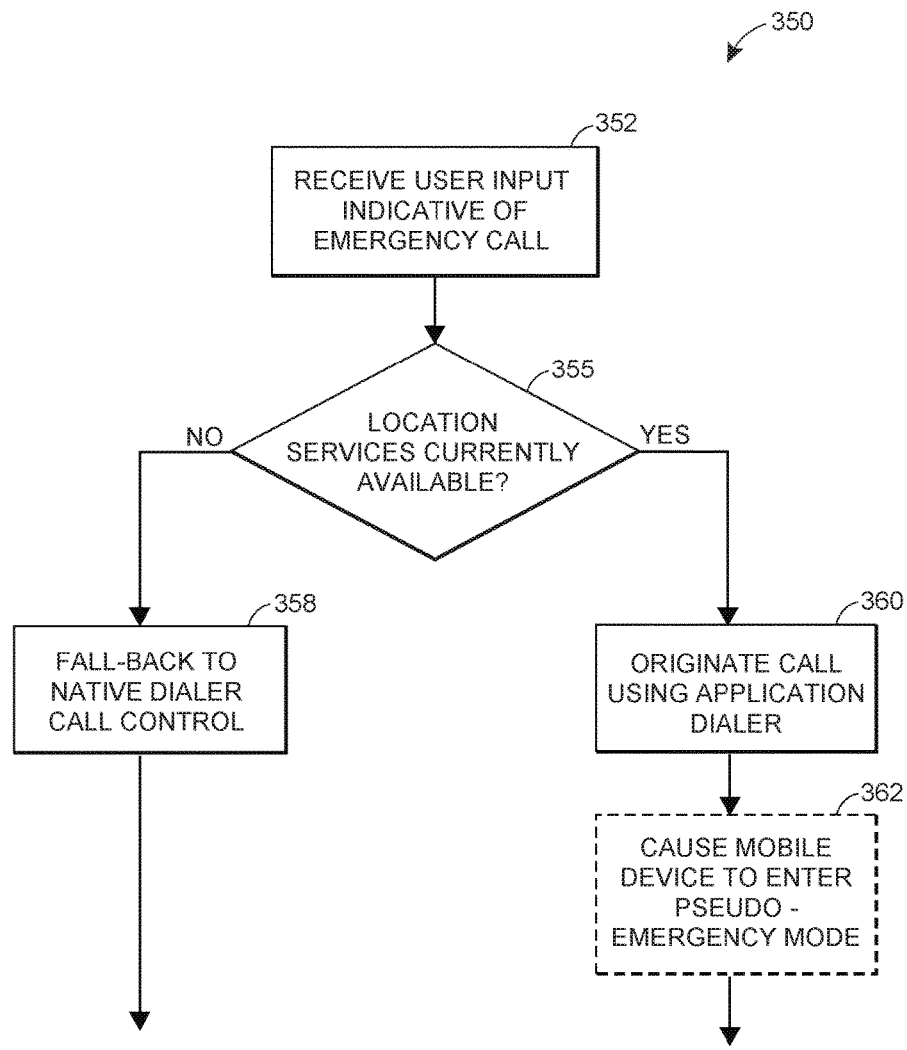
FIG. 4 depicts a flow diagram of an example method of originating an emergency call at a mobile communication device, where the method may be utilized in conjunction with embodiments of the architecture of FIG. 1 and/or the mobile communication device of FIG. 2 or 3.

To this end, FIG. 4 depicts a flow diagram of an example method 350 of originating an emergency call at a mobile communication device or PED (Personal Electronic Device), at least portions of which may operate in conjunction with embodiments of the system 10 and/or the PPNBE 100 of FIG. 1 (or the PPNBE 315 of FIG. 3), with the mobile device 200 of FIG. 2 (or the mobile device 310 of FIG. 3), and/or with the environment 300 of FIG. 3. For example, at least a portion of the method 350 may be executed by the mobile device 200. Of course the method 350 may be executed in conjunction with systems, exchanges, devices, and/or methods other than those discussed with respect to FIGS. 1-3. However, for ease of discussion, and not for limitation purposes, the method 350 is described herein with simultaneous reference to FIGS. 1-3.

At a block 352, the method 350 may include receiving, at a PPNBE-compatible mobile communication device or PED, user input indicative of an emergency call. For example, the user input may be indicative of an outgoing call placed to 9-1-1, 1-1-2, or any other emergency number. The user input may be received via a user interface 205 of a mobile communication device 200, such as via a touch screen, a microphone, etc. An indication of the emergency number indicated by the user input may be provided to (e.g., may be received at) an application dialer of the mobile device, such as the PN application dialer 258.

At a block 355, the method 350 may include determining whether or not location based services are currently available for the mobile communication device 200. The determination may be made based upon the output of an API made available by the operating system 225. For example, if the operating system 252 is an Android™ operating system, location services may be unavailable if the output of the getLastLocation method is null. On the other hand, if the operating system 252 is an iOS® operating system, location services may be unavailable if the output of the locationServicesEnabled method is NO. Of course, the aforementioned methods represent one example method of determining the availability of location services and, as such, different operating systems may require the use of other commands to determine the availability of location services.

When the location services for the mobile communication device 200 is determined (block 355) to be currently unavailable, control of the emergency call origination may be passed, released, or otherwise transferred from the PN application dialer 258 to the native dialer 242 of the mobile device 200 (block 358). As such, the emergency call origination may "fall-back" to be processed by the native dialer 242 instead of by the PN application dialer 258. The call origination generated under the control of the native dialer 242 may be routed via transceiver/antenna 305a towards its destination, PSAP 330a, without traversing the PPNBE 100, in a manner such as previously discussed with respect to FIGS. 1 and 3. As such, as the call is controlled by the native dialer 242, indicia and other information included in the call origination is compatible with features and capabilities that are provided by the PSTN.

In an embodiment, control of the emergency call origination is passed, released, or otherwise transferred from the PN application dialer 258 to the native dialer 252 (block 358) via a link (e.g., reference 270 of FIG. 2). For example, the digits corresponding to the emergency number may be passed or provided by the PN application dialer 258 to the native dialer 252 via the link 270, and the native dialer 252 may continue with the generation and transmission of the emergency call origination as well as subsequent call processing. The link 270 may take any desired form, such as a function call, a passing of a pointer to a memory location in which the destination telephone number digits are stored and/or of other information, an object, a binding, an intent, etc. In an embodiment, the operating system 225 may provide the link 270 that is utilized by the PN application dialer 258 to pass, release, and/or otherwise transfer the destination telephone number digits and/or control of the call to the native dialer 252. For example, if the operating system 225 of the mobile communication device 200 is an Android™ operating system, the link 270 may comprise an intent to generate the emergency call.

When the location services for the mobile communication device 200 is determined (block 355) to be currently available, control of the call origination may be maintained at the PN application dialer 258, and the PN application dialer 258 may cause an emergency call origination message to be generated and transmitted from the mobile communication device 200 (block 360). The call origination generated under the control of the PN dialer 258 may be routed towards its destination, the PSAP 330a, via the transceiver/antenna 305b and the PPNBE 100, in a manner such as previously discussed with respect to FIGS. 1 and 3. Further, the PN application dialer 258 may handle subsequent processing of the emergency call.

However, as described above, the operating system 225 may not enable third party developer of the PN application dialer 258 to access all of the APIs available to the native applications 230. As an example, after the native dialer 252 originates an emergency call, the native dialer 252 may cause the mobile communication device 200 to enter an emergency callback mode. When the mobile communication device 200 is in the emergency callback mode, the operating system 225 may override the settings of the mobile communication device 200 prevent the mobile communication device 200 from missing or otherwise preventing the reception of an incoming call from an emergency response center (e.g., a PSAP). To this end, when the mobile communication device 200 is in emergency callback mode, the operating system 225 may disable data connections and/or prevent the user from originating calls to non-emergency numbers. Moreover, even if the PN application dialer 258 was permitted to trigger the emergency callback mode supported by the operating system 225, because the PN application dialer 258 may communicate with the PSAP 330a and/or the PPNBE 100 via a packet-switched connection, if the operating system 225 disables data connections, the PN application dialer 232 will be unable to receive an incoming call.

Accordingly, in some embodiments, at a block 362, after the PN application dialer 258 originates the emergency call, the method 300 may include the PN application 232 causing the mobile communication device 200 to enter a pseudo-emergency mode. Although causing the mobile communication device 200 to enter the pseudo-emergency mode may generally relate to a similar concern addressed by the emergency mode supported by the operating system 225, the pseudo-emergency mode may require a different implementation to account for the PN application dialer 258 being a non-native application that may communicate via a packet-switched connection. As an example, as described above, when the emergency call is originated by the PN application dialer 258, the geographic location data utilized to route the emergency call origination message may be generated by the mobile communication device 200 itself (as opposed to, for example, based on the geographic location of the transceiver/antenna 305a). Accordingly, the PN application 232 may increase the accuracy of the location based services as part of the pseudo-emergency mode. To this end, if the operating system 225 is an Android™ operating system, the PN application 232 may switch the mobile communication device 200 from a coarse location mode to a fine location mode. On the other hand, if the operating system 225 is an iOS® operating system, then the PN application 232 may modify a desiredAccuracy property of a location object.

As another example, to implement the pseudo-emergency mode the PN application 232 may cause the mobile communication device 200 to block non-emergency calls received via the PPNBE service provider. To this end, when the PN application 232 detects that an incoming call received via the PPNBE service provider, the PN application 232 may determine whether the incoming call was originated by a number associated with an emergency response center (e.g., PSAP). When the incoming call is not from a number associated with an emergency response center, the PN application 232 may cause the mobile communication device 200 to respond with a busy or other error code, cause the incoming call ring in the background without presenting an interface to the user of the mobile communication device to answer the incoming call, or take other measures to prevent the mobile communication device 200 from indicating the presence of the incoming call. Conversely, when the incoming call is from a number associated with an emergency response center, the PN application 232 may invoke the routines typically utilized by the PN application 232 to indicate the presence of the incoming call to the user.

As yet another example, the PN application 232 may cause the user interface 205 to visually indicate to the user that the mobile communication device 200 is in the pseudo-emergency mode. Although the emergency mode implemented by the PN application 232 is referred to herein as a pseudo-emergency mode, it should be appreciated that in order to avoid user confusion, the visual indication may still refer to the pseudo-emergency mode as simply emergency mode or emergency callback mode. According to certain aspects, the PN application 232 may cause the mobile communication device 200 to exit the pseudo-emergency mode after a threshold amount of time passes (e.g., five minutes) since the termination of the emergency call.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Accordingly, it should be understood that the methods and apparatus described herein are illustrative only and are not limiting upon the scope of the claims.

Thus, many modifications and variations may be made in the techniques and structures described and illustrated herein without departing from the spirit and scope of the present claims.

What is claimed:

1. A mobile device, comprising:
   an application that includes an application dialer communicatively connected to a wireless communication interface, wherein the application is configured to:
      receive user input indicative of an emergency call;
      determine whether location services are currently available for the mobile device;
      when the location services are currently unavailable, pass control to a native dialer to originate, via the wireless communication interface, the emergency call; and when the location services are currently available:
  determine a geographic location of the mobile device based upon an output from an API supported by an operating system of the mobile device, wherein the geographic location of the mobile device is not an IP address; and
  communicate, via the wireless communication interface, with an emergency call router, wherein data packets forming communications with the emergency call router utilize a packet header format that indicates the geographic location.

2. The mobile device of claim 1, wherein the application communicates with the emergency call router by routing the data packets over a private packet network exchange.

3. The mobile device of claim 1, wherein the native dialer is factory installed onto the mobile device, and the application dialer is a default dialer of the mobile device.

4. The mobile device of claim 1, to pass control to the native dialer, the application dialer is further configured to utilize an intent to originate the emergency call via the native dialer.

5. The mobile device of claim 1, wherein when the location services are currently available, the application dialer originates, via the wireless communication interface, the emergency call.

6. The mobile device of claim 5, wherein the application is further configured to cause the mobile device to enter a pseudo-emergency mode when the application dialer originates the emergency call.

7. The mobile device of claim 6, wherein to cause the mobile device to enter the pseudo-emergency mode, the application is further configured to increase an accuracy of the geographic location output by the API.

8. The mobile device of claim 6, wherein to cause the mobile device to enter the pseudo-emergency mode, the application is further configured to prevent the mobile device from indicating the presence of an incoming call when the incoming call is originated from a number not associated with an emergency response center.

9. The mobile device of claim 6, wherein to cause the mobile device to enter the pseudo-emergency mode, the application is further configured to cause a visual indication that the mobile phone has entered the pseudo-emergency mode to be displayed by a display of the mobile device.

10. The mobile device of claim 5, wherein to originate the emergency call, the application dialer is further configured to transmit a SIP invite message to the emergency call router.

11. The mobile device of claim 1, wherein the application is factory installed onto the mobile device.

12. The mobile device of claim 1, wherein the application is loaded onto the mobile device after a factory installation of the mobile device has been completed.

13. A method comprising:
  receiving, at an application dialer of a mobile communication device, user input indicative of an emergency call;
  determining, by the application dialer, whether or not location services are currently available for the mobile device;
  when location services are currently unavailable, releasing control of an origination of the emergency call to a native dialer of the mobile communication device, wherein the native dialer is not the application dialer; and
  when location services are currently available, originating, by the application dialer, the emergency call by transmitting a SIP invite message to an emergency call router, wherein the SIP invite message utilizes a packet header format that includes an indication of a geographic location.

14. The method of claim 13, wherein utilizing the packet header format that includes the indication of the geographic location comprises:
  receiving, by the application dialer, the geographic location as an output of an API.

15. The method of claim 13, wherein the application dialer is included within an application, and wherein the method further comprises:
  causing, by the application, the mobile device to enter a pseudo-emergency mode when the application dialer originates the emergency call.

16. The method of claim 15, wherein causing the mobile device to enter the pseudo-emergency mode comprises:
  causing, by the application, the mobile communication device to increase an accuracy of a geographic location output by an API.

17. The method of claim 15, wherein causing the mobile device to enter the pseudo-emergency mode comprises:
  preventing, by the application, the mobile communication device from indicating the presence of an incoming call when the incoming call is originated from a number not associated with an emergency response center.

* * * * *